United States Patent [19]

Sevrence

[11] 4,324,503
[45] Apr. 13, 1982

[54] TWO-PIECE ANCHORAGE DEVICE

[75] Inventor: Warren E. Sevrence, Adrian, Mich.

[73] Assignee: Acco Industries, Inc., Bridgeport, Conn.

[21] Appl. No.: 105,914

[22] Filed: Dec. 21, 1979

[51] Int. Cl.³ .............................................. F16B 9/00
[52] U.S. Cl. .................................. 403/197; 403/238; 285/162; 16/2; 74/501 R
[58] Field of Search ............ 403/197, 238, 239, 288; 16/2, 108; 74/501 R; 174/65 R, 65 G; 285/162

[56] References Cited

U.S. PATENT DOCUMENTS

| | | | |
|---|---|---|---|
| 1,848,442 | 3/1932 | Tideman | 285/162 |
| 2,244,977 | 6/1941 | Hansman et al. | 16/2 X |
| 2,869,905 | 1/1959 | Bratz | 285/162 X |
| 2,954,248 | 9/1960 | Brickman | 74/501 |
| 3,858,151 | 12/1974 | Paskert | 285/162 X |
| 4,012,578 | 3/1977 | Moran | 285/162 X |
| 4,131,379 | 12/1978 | Gordy et al. | 403/197 |
| 4,156,103 | 5/1979 | Dola et al. | 174/65 R |

Primary Examiner—Andrew V. Kundrat
Attorney, Agent, or Firm—Pennie & Edmonds

[57] ABSTRACT

A two-piece anchorage device for securing a cable conduit to a wall opening. The device includes a tubular body piece adapted to extend through the wall opening and to be secured to the outer periphery of the cable conduit. The body piece includes a collar adapted to operatively engage a side of the wall opening and a lower body portion adapted to extend longitudinally along the cable conduit. An upper body portion is connected to a side of the collar opposite the lower body portion and has a groove therein. The anchorage device also includes an anchor clip piece having stops engaging the groove of the upper body portion and a plurality of depressible prongs adapted to engage a side of the wall opening.

7 Claims, 8 Drawing Figures

TWO-PIECE ANCHORAGE DEVICE

FIELD OF THE INVENTION

The invention relates to a two-piece anchorage device for securing a cable conduit to a wall opening and where the conduit is adapted to receive a movable control cable.

BACKGROUND OF THE INVENTION

Various anchorage devices for anchoring a cable assembly to a wall opening are known where the cable assembly includes a flexible cable conduit surrounding and providing a guide for a control cable. Such assemblies are used, for example, in automobile brake systems where one end of the control cable is connected to the expansion part of a brake contained in a brake housing and the other end is connected to a control knob. The control cable in such a system is surrounded and guided by a cable conduit extending between the brake housing and the control knob. It is a requirement in such brake systems that the cable assembly be easily installed into an automobile which in turn requires that the assembly be flexible. It is a further requirement that the control cable contained within the cable conduit be protected against foreign matter and moisture which might act to foul the brake assembly.

In order that such control cable assemblies may be economically and quickly assembled into an automobile, it is important that any anchorage device for anchoring the cable conduit to the wall opening comprise a minimum number of easily formed parts and that the anchorage device be self-locking with respect to a wall opening when inserted into the opening.

It is therefore an object of my invention to provide for an anchorage device for anchoring a cable conduit to a wall opening where the anchorage device comprises a minimum number of easily formed parts which may be conveniently assembled together to form a self-locking device which when inserted in a wall opening will anchor a cable conduit with respect to the opening and which at the same time will provide a sealing means to prevent entry of foreign matter or moisture into the cable conduit surrounding a control cable.

DESCRIPTION OF THE INVENTION

Broadly an anchorage device constructed according to my invention comprises a tubular body piece and an anchor clip piece where the tubular body piece is adapted to be fixed to the outer periphery of a cable conduit. The tubular body piece is adapted to extend through a wall opening and has an upper and lower body portion separated by a collar which is adapted to operatively engage a side of the wall opening either directly or by way of one or more washers or sealing grommets. The upper body portion has a groove which is engaged by stops on the anchor clip piece which surrounds the upper body portion. The anchor clip piece includes a plurality of depressible prongs which are depressed by the edges of the wall opening when the anchorage device is pushed through the opening and which spring out after the device is positioned in the opening so as to engage a side of the wall opening. The anchorage device self-locks with respect to the wall opening so that the prongs engage one side of the opening and the collar operatively engages the other side of the opening.

In one embodiment of the invention, the anchor clip itself preferably comprises a strip bent into a circular shape where the strip has a plurality of H-shaped cutouts therein with the portions of the strip between the vertical legs of the H-shaped cutouts being bent in opposite directions to form the stops and depressible prongs of the anchor clip piece. In this form of the invention washers and grommets may be positioned between the collar and the wall opening to accommodate walls of varying thicknesses and to assure a tight fit between the anchorage device and both sides of the wall to securely lock the anchorage device into place.

In a further embodiment of the invention, the anchor clip piece comprises a strip bent into a circular shape where the strip has a plurality of U-shaped cutouts with the portion of the strip between the vertical legs of each U-shaped cutout being bent outwardly on one side of the strip to form a depressible prong and with portions of the strip forming the bottom base of each U-shaped cutout being bent outwardly of both sides of the strip wherein one portion extending outwardly of the strip on the same side as the depressible prong forms a tab to engage a side of the wall and wherein the portion on the opposite side of the strip forms a stop adapted to engage the groove of the upper body portion.

In a still further embodiment, the tab and portion of the anchor clip forming the stop are punched out of areas of the strip extending between the depressible prong.

BEST MODE FOR CARRYING OUT THE INVENTION

Figure 1:
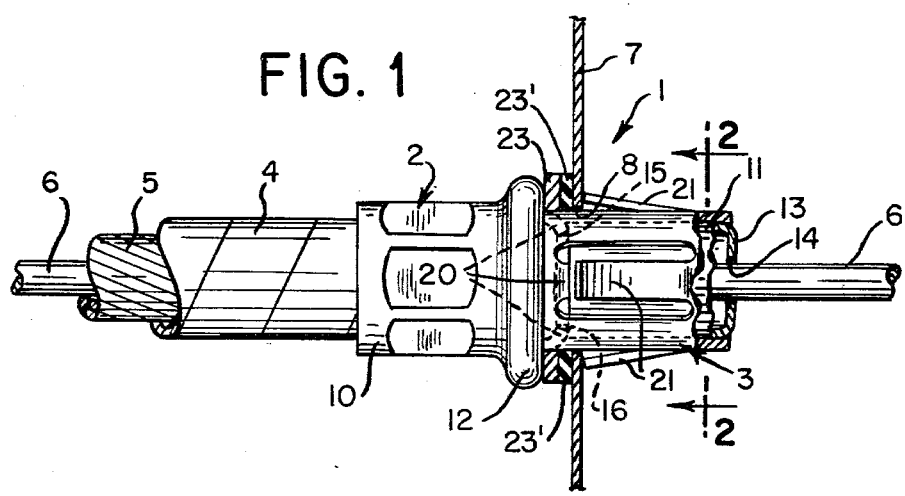
FIG. 1 is a partial sectional view of an anchorage device constructed according to the invention.
Figure 2:
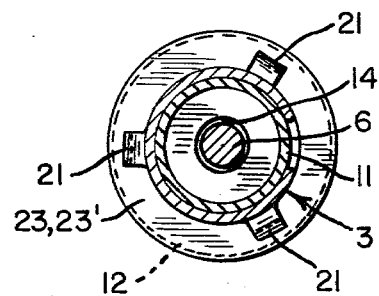
FIG. 2 is a cross-section of the anchorage device of FIG. 1 taken along lines 2—2.

Referring to FIGS. 1 and 2 there is illustrated a two-piece anchorage device 1 comprising a tubular body piece 2 and an anchor clip 3. The tubular body piece 2 surrounds a cable sheath 4 which in turn protects a cable conduit 5 through which a movable control cable 6 extends. The anchor device serves to secure cable conduit 5 to a wall 7 through wall opening 8.

The body piece 2 has a lower body portion 10 which extends longitudinally along the sheath 4 and cable conduit 5. The tubular body piece also has an upper portion 11 where the upper and lower portions are separated by a collar or bead 12. One end 13 of the upper portion is bent over so as to form an opening 14 the sides of which are closely spaced with respect to the control cable 6 so as to prevent entry of foreign matter into the interior of the upper body portion. A groove 15 in the tubular body piece is positioned between the upper body portion 11 and the collar 12 to provide a radially extending shoulder 16.

The anchor clip piece 3 has a plurality of flexible tabs 20 which are adapted to engage in the groove 15 so that an end of a table acts as a stop when it engages the shoulder 16 of the groove to urge the upper body piece in the right-hand direction as shown in FIG. 1 with the result that the collar 12 will firmly engage the wall 7 either directly or operatively through washers 23 and grommets 23'. The anchor clip piece 3 is also provided with flexible prongs 21 which prevent movement of the anchorage device in the left-hand direction as shown in FIG. 1. The metal washer 23 and rubber grommet 23' may be positioned on the anchor clip piece 3 in order to accommodate walls of different thicknesses and to provide a tight fit between the collar 12 and the wall 7 to securely lock the anchorage device into place with respect to the wall 7.

Figure 3:
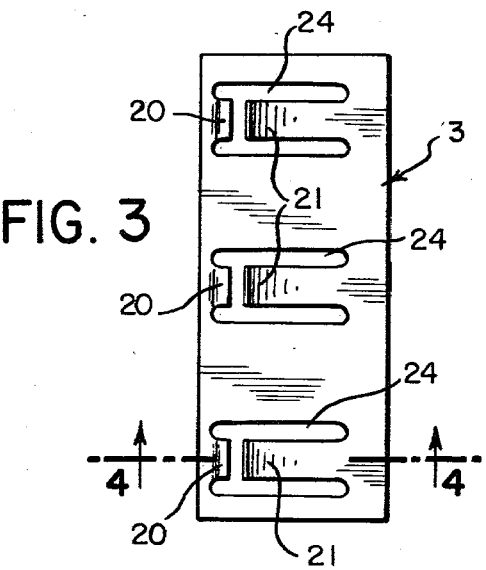
FIG. 3 is a developed view of an anchor clip utilized in the anchorage device of FIG. 1.
Figure 4:
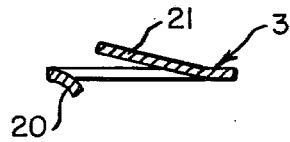
FIG. 4 is a cross-sectional view of the anchor clip of FIG. 3 taken along lines 4—4.

As shown in FIGS. 3 and 4 the anchor clip piece 3 comprises a strip having a plurality of H-shaped cutouts 24 therein. The portions between the vertical legs of the H-shaped cutouts are bent in alternate directions in order to form the prongs 20 and 21 as shown in FIG. 4.

The anchorage device is assembled into the wall opening 8 by forcing the upper body piece 11 through the opening thus depressing the prongs 21. When the prongs are through the side of the opening and any grommet that may be applied thereto, the prongs may then spring out as shown in FIGS. 1 and 2 which will prevent the anchorage device from being pulled back through the wall opening.

The anchorage clip may be stamped from strip material and may comprise a high carbon steel or plastic material. The body piece 2 may comprise a stamping or casting of a metal material or may comprise a plastic molded material.

The body piece may include an internal seal within the upper body piece so as to surround and seal with the control cable to prevent entry of moisture or other foreign material into the cable conduit surrounding the control cable.

The sheath portion 4 may comprise a tubular plastic material or, as shown in FIG. 1, a flattened metal ferrule.

Figure 5:
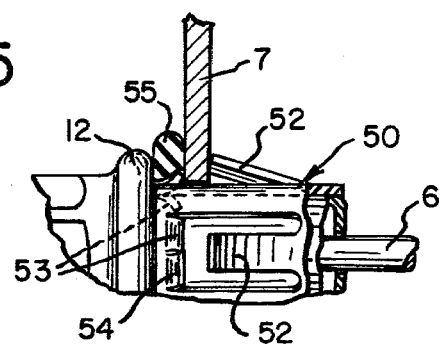
FIG. 5 is a partial sectional view of a further embodiment of the anchorage device of that of FIG. 1.
Figure 6:
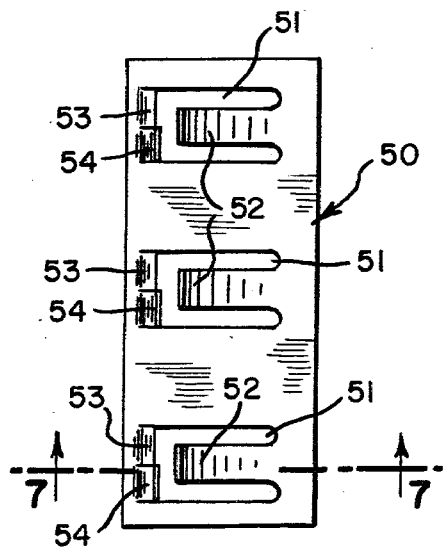
FIG. 6 is a developed view of the anchor clip utilized in the anchorage device of FIG. 5.
Figure 7:
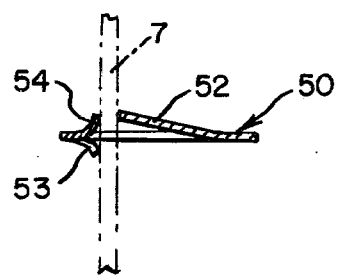
FIG. 7 is a cross-sectional view of the anchor clip of FIG. 6 taken along lines 7—7.

Referring to FIG. 5 there is illustrated a further embodiment of a two-piece anchorage device wherein the tubular body piece and cable assembly is the same as that of the embodiment of FIG. 1 but which includes a different anchorage clip piece. As shown the anchorage device engages a wall 7 and is locked to the wall by means of anchorage clip piece 50. The anchorage clip piece 50 as shown in FIGS. 6 and 7 comprises a strip having a plurality of U-shaped cutouts 51 therein where the portions of the strip between the vertical legs of the U-shaped cutouts form depressible prongs 52. The portions of the strip forming the bottom or base of each U-shaped cutout are bent outwardly of the strip to form a stop 53 on one side of the strip and a stop 54 on the opposite side of the strip. Stop 53 is similar to stop 20 of the strip of FIG. 3 and is adapted to engage the groove of the upper body portion. Stop 54 is adapted to engage with one side of the wall structure 7. As shown in FIGS. 5 and 7, prongs 52 and stops 54 lock the anchor clip piece in place with respect to the wall 7 and because the prongs and stops are resilient thus acting like springs, any lost motion between the anchorage clip piece 50, and consequently the anchorage device, and the wall 7 is prevented.

A grommet 55 may be inserted over the anchor clip piece 50 so as to be interposed between the wall 7 and the collar 12 of the tubular body portion to form a seal.

The manner of the assembly of the anchorage device into the wall opening is generally similar to that of the embodiment of FIG. 1. Namely the anchor clip piece 50 is slipped over the end of the upper body portion until the stops 53 engage in the groove of the upper body portion. The seal 55 is then slipped over the anchor clip piece until it engages the collar 12. The anchorage device is then inserted through the wall opening depressing the prong 52 until the prongs are completely through the wall opening at which point they will spring out into the position shown in FIG. 5, and at the same time, the stops 54 will also engage the wall whereby the anchorage device will be locked in the wall opening and any lost motion between the anchorage device and the wall opening will be prevented.

Figure 8:
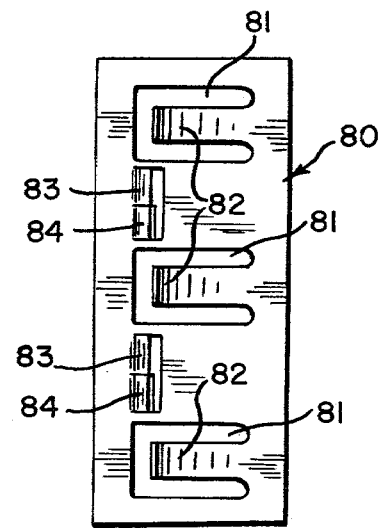
FIG. 8 is a developed view of a still further form of an anchor clip.

Referring to FIG. 8, there is illustrated a further form of an anchor clip 80 adapted for use with a tubular body piece of the type illustrated in FIG. 5 and which engages a wall and groove of the body piece in the manner shown in FIG. 7. As shown, the anchor clip 80 has a plurality of U-shaped cutouts 81 forming depressible prongs 82. Tabs 83 and 84 are punched out on opposite sides of the strip in areas of the strip extending between the prongs 82. While the prongs 82 are shown as being formed from a U-shaped cutout, it is apparent that they could be formed by other means, the only requirement being that they be depressible so that the assembly may be inserted through a wall opening.

It is seen from the drawings that the two-piece anchorage device as disclosed in the drawings may be quickly assembled into a wall opening, such as an opening in an automobile dashboard, in order to anchor a cable conduit to the dashboard and where the cable conduit serves to guide a control cable, as for example, a control cable in an automobile braking system.

I claim:

1. A two-piece anchorage device for securing a cable conduit with respect to a wall opening, said device including a tubular body piece adapted to extend through the wall opening and to be secured to the outer periphery of a cable conduit where said tubular body piece comprises a collar adapted to operatively engage a side of said wall opening, a lower body portion connected to one side of said collar and adapted to extend longitudinally along the cable conduit and an upper body portion connected to a side of said collar opposite said lower body portion including a radially extending shoulder, and an anchor clip piece surrounding and fixed to said upper body portion having a plurality of depressible prongs adapted to engage a side of a wall opening opposite said collar whereby relative movement of said cable conduit with respect to said wall opening is prevented and having a plurality of stops engaging said shoulder to prevent longitudinal movement of said clip piece with respect to said body piece in a direction away from said collar with said anchor clip piece comprising a flat strip rolled into a round configuration and wherein said strip has a plurality of H-shaped cutouts with the portions of the strip between the vertical legs of the H-shaped cutouts being bent in alternate directions to form said stops and depressible prongs.

2. A two-piece anchorage device for securing a cable conduit with respect to a wall opening, said device including a tubular body piece adapted to extend through the wall opening and to be secured to the outer periphery of a cable conduit where said tubular body piece comprises a collar adapted to operatively engage a side of said wall opening, a lower body portion connected to one side of said collar and adapted to extend longitudinally along the cable conduit and an upper body portion connected to a side of said collar opposite said lower body portion including a radially extending shoulder, and an anchor clip piece surrounding and fixed to said upper body portion having a plurality of depressible prongs adapted to engage a side of a wall opening opposite said collar whereby relative movement of said cable conduit with respect to said wall opening is prevented and having a plurality of stops engaging said shoulder to prevent longitudinal movement of said clip piece with respect to said body piece in a direction away from said collar with said anchor clip piece comprising a flat strip rolled into a round configuration and wherein said strip has a plurality of U-shaped cutouts with the portions of the strips between the vertical legs of the U-shaped cutouts being bent radially outwardly of the round configuration to form said depressible prongs and wherein portions of the strip forming part of the bases of the U-shaped cutouts are bent radially outwardly of the round configuration to form stops adapted to engage a side of the wall opposite said depressible prongs and wherein portions of the strip forming part of the bases of the U-shaped cutouts are bent radially inwardly of the round configuration to form said stops engaging said shoulder.

3. A two-piece anchorage device for securing a cable conduit with respect to a wall opening, said device including a tubular body piece adapted to extend through a wall opening and to be secured to the outer periphery of a cable conduit where said tubular body piece comprises a collar adapted to operatively engage a side of said wall opening, a lower body piece portion connected to one side of said collar and adapted to extend longitudinally along the cable conduit and an upper body portion connected to a side of said collar opposite said lower body portion having a groove adjacent said collar between the upper body portion and said collar with a wall of said groove forming a radially extending shoulder, and an anchor clip piece surrounding and fixed to said upper body portion including a plurality of depressible prongs adapted to engage a side of a wall opening opposite said collar whereby relative movement of said cable conduit with respect to said wall opening is prevented and including a plurality of stops engaging said shoulder to prevent longitudinal movement of said clip piece with respect to said body piece in a direction away from said collar.

4. In an anchorage device for receiving a control cable conduit assembly in an opening in a housing wall where said control cable conduit assembly includes a casing and an axially movable core member in said casing, the improvement comprising in that said anchorage device includes:
 (a) a tubular body piece adapted to extend through said opening and to be secured to the outer periphery of said casing where said body piece has
  (i) a collar adapted to operatively engage a side of said wall,
  (ii) a lower body portion connected to one side of said collar and adapted to extend longitudinally along said casing, and
  (iii) an upper body portion connected to the side of said collar opposite from said lower body portion including a groove adjacent the collar between the upper body portion and said collar with a side wall of the groove forming a radially extending shoulder, and
 (b) an anchor clip piece surrounding and fixed to said upper body portion having a plurality of depressible prongs adapted to engage a side of said opening opposite said collar and a plurality of stops engaging said shoulder.

5. In an anchorage device according to claim 4, the improvement further comprising in that the upper body portion includes therein a sealing means adapted to sealingly engage with a core member.

6. In an anchorage device according to claim 4, the improvement further comprising in that the anchor clip piece comprises a strip bent into a circular shape having a plurality of cutouts therein with portions of the strip adjacent cutouts being bent in alternate directions to form said stops engaging said shoulder and said depressible prongs.

7. In an anchorage device according to claim 6, the improvement further comprising in that said anchor clip piece has in addition portions bent in the same direction as said depressible prongs to form stops adapted to engage a housing wall.

* * * * *